(12) United States Patent
Gautier et al.

(10) Patent No.: US 6,520,064 B1
(45) Date of Patent: Feb. 18, 2003

(54) PNEUMATIC SERVO-DRIVE MECHANISM FOR POWER BRAKING

(75) Inventors: Jean Pierre Gautier, Aulnay-Sous-Bois (FR); Maurice Gerbauer, Sevran (FR); Miguel Perez, Argentuil (FR)

(73) Assignee: Robert Bosch GmbH, Stuttgart (DE)

( * ) Notice: Subject to any disclaimer, the term of this patent is extended or adjusted under 35 U.S.C. 154(b) by 50 days.

(21) Appl. No.: 09/806,250
(22) PCT Filed: Jan. 8, 2001
(86) PCT No.: PCT/FR01/00051
§ 371 (c)(1), (2), (4) Date: Oct. 15, 2001
(87) PCT Pub. No.: WO01/51328
PCT Pub. Date: Jul. 19, 2001

(30) Foreign Application Priority Data

Jan. 14, 2000 (FR) .............................. 00 00496

(51) Int. Cl.[7] ................................. F15B 9/10
(52) U.S. Cl. ..................................... 91/376 R
(58) Field of Search ....................... 91/376 R

(56) References Cited

U.S. PATENT DOCUMENTS 4,641,568 A * 2/1987 Boehm et al. ............ 91/376 R
5,579,675 A * 12/1996 Gautier et al. ............ 91/376 R

* cited by examiner

Primary Examiner—F. Daniel Lopez
(74) Attorney, Agent, or Firm—Leo H McCormick, Jr.; Warren Comstock

(57) ABSTRACT

A pneumatic servomotor (1) for an assisted braking having a housing, separated by a diaphragm (5) into a first variable-volume chamber (3) and a second variable volume chamber (7) therein. During a. brake application a force applied to a control rod (13) moves to allow a first flap (19) to isolate the second chamber (7) from the first chamber (3) and thereafter allow a second flap (23) to open and allow pressurized assist fluid to be communicated to the second chamber (7). The diaphragm (5) has a lip (35) thereon that engages the housing to define a thrust chamber (41). On opening of the second flap (19) allows the pressurized assist fluid is initially communicated to the thrust chamber (41) and only after a predetermined travel of the control rod (13) is the pressurized assist fluid communicated to the second chamber (7) for creating a pressure differential between the fluid in the first chamber (3) and second chamber (7) to develop an output force to effect a brake application. On termination of the input force to the control rod (13) the lip (35) provides for one-way isolation to permit the discharge of the assistance fluid from second chamber (7) to allow for equalization of fluid pressure in the first (3) and second (7) chambers.

6 Claims, 7 Drawing Sheets

PNEUMATIC SERVO-DRIVE MECHANISM FOR POWER BRAKING

This invention relates to a pneumatic servomotor for an assisted braking and, more particularly, of the type providing an improved assistance control.

BACKGROUND OF THE INVENTION

It is quite usual to amplify the force, which a driver exerts on a brake pedal, by means of a pneumatic servomotor (also called a "booster"), comprising a variable-volume front chamber, separated from a variable-volume rear chamber by a tight flexible diaphragm and by a rigid skirt driving a pneumatic piston which bears, through a push rod, on the primary piston of a tandem master cylinder of a hydraulic braking system. The front chamber, directed towards the tandem master cylinder, is hydraulically connected to a vacuum source whereas the rear chamber, in the opposite direction to the front chamber, is hydraulically connected, using a valve control, to a propellant fluid source, typically atmospheric-pressure air.

At rest, that is when the driver does not actuate the brake pedal, the front and rear chambers are interconnected, while the rear chamber is isolated from the atmospheric pressure. On braking, first the front chamber is isolated from the rear chamber and then air is admitted into the rear chamber.

Unfortunately, when the brake pedal is depressed, the sudden opening of the air-supply port of the rear chamber causes the pneumatic piston to move forward too fast. The initial resistance to the travel of this pneumatic piston is quite weak. As a matter of fact, on the one hand, there is a great pressure difference between the front and the rear chambers of the servomotor and, on the other hand, the operational clearances of the tandem master cylinder are taken up. This swift advance of the pneumatic piston may cyclically open the passage connecting up the front chamber and the rear chamber, which generates a noise resembling that of wipers set in motion on a dry windscreen and therefore called a "wiper noise" in the art. Such noise, although normal, is considered quite unpleasant by the users who fear some dysfunctioning of the system. Besides, the reopening of the passage connecting up the front and rear chambers of the servomotor reduces the assistance efficiency at the beginning of the braking process.

SUMMARY OF THE INVENTION

Therefore, it is an object of the present invention to provide a servomotor for an assisted braking, ensuring a noiseless running, especially by a reduction of the so-called "wiper noise" to the minimum.

Another object of this invention consists in providing a, pneumatic servomotor for an assisted braking with a quite high efficiency.

Still another object of this invention consists in providing a servomotor for an assisted braking with a quite high efficiency.

It is also an object of the present invention to provide a servomotor for an assisted braking, ensuring a quick-acting assistance.

It is another object of this invention to provide a braking system including a pneumatic assistance servomotor and a tandem master cylinder, equipped with superassistance means for emergency braking situations, of the types described in EP 0 662 894 and FR 2 751 602, and having a low variation of the starting threshold of superassistance means in the case of an emergency braking situation.

These objects are achieved, in accordance with this invention, by a pneumatic servomotor for an assisted braking, fitted with means capable of resisting too fast a forward travel of the pneumatic piston when the brake is actuated, which otherwise might lead to an undesired reopening of the passage connecting the front chamber with the rear chamber of the assistance servomotor.

In a first embodiment, the servomotor according to the present invention comprises resilient means, preferably non-linear ones, opposing the forward travel of the pneumatic piston until the latter exerts a predetermined force.

According to a second embodiment, a device slows down the pneumatic piston by friction.

However, these first two embodiments of the device according to the invention reduce the assistance servomotor performance.

The preferred embodiment of an assistance servomotor in accordance with the present invention comprises means for a temporary isolation of part of the diaphragm, when the air-supply valve of the rear chamber is opened, such means being situated in said rear chamber, so as to temporarily limit the rear chamber area on which the pressure is exerted for the forward travel of the pneumatic piston. The forward motion of the piston allows the air to access the whole diaphragm surface area, for the desired assisted braking. Advantageously, the area of the rear chamber, which is supplied with air at first, corresponds to the axially central area of the rear chamber. In a advantageous manner too, the element affording the air confinement to the initially air-supplied area of the rear chamber is a lip, judiciously arranged coaxially with the control rod and the push rod of the assistance servomotor.

The main subject of this invention is a pneumatic servomotor for an assisted braking, comprising a first variable-volume chamber and a second variable-volume chamber, tight sealing means adapted for isolating, on actuation, the first chamber from the second chamber, means for creating a pressure difference between said first chamber and said second chamber, and a pneumatic piston capable of being driven by a difference in the pressures prevailing in said first chamber and said second chamber, characterised in that it further comprises means for slowing down the initial travel of the pneumatic piston at the beginning of the braking operation, without interfering with the efficiency of the subsequent assisted braking.

The present invention also deals with a servomotor, characterised in that it further comprises a control rod, capable of being driven by the travel of a brake pedal, said control rod bearing a first flap, constituting said means for isolating, on actuation, the first chamber from the second chamber, as well as a second flap for supplying one of said first chamber and said second chamber with a pressurized assistance fluid, said flaps cooperating with elements of said pneumatic piston in such a way that the application of the control rod onto the pneumatic piston brings about the closing of the tight sealing flap for isolating said first chamber and second chamber, and in that said means for slowing down the initial travel of the pneumatic piston, at the beginning of the braking operation, keep the pneumatic piston from moving forward faster that the control rod in order to prevent, or at least minimize, the reopening of said first tight sealing flap isolating the first chamber from the second chamber.

Another subject matter still of the present invention is a servomotor, characterised in that the means for slowing down the initial travel of the pneumatic piston comprise means for reducing the initial driving force for the pneumatic piston.

According to another aspect of the invention, a servomotor is characterised in that the means for slowing down the initial travel of the pneumatic piston comprise means for confining the pressurized assistance fluid to an area in one of said first or second chambers, so as to reduce the surface area on which the pressure difference between both chambers is initially applied.

Another subject matter still of the present invention is a servomotor, characterised in that the means for slowing down the initial travel of the pneumatic piston comprise a lip which defines, at the beginning of the braking operation, a radially-inner initial thrust chamber.

In accordance with another aspect of the present invention, a servomotor is characterised in that said lip is a lip providing a one-way isolation permitting, towards the end of the braking operation, the discharge of the assistance fluid from said both chambers.

This invention also deals with a servomotor, characterised in that the lip comprises a first area, inclined with respect to a servomotor axis and directed towards said axis, and a second area substantially perpendicular to said axis.

Another aspect of the present invention lies in a servomotor, characterised in that it comprises a flexible diaphragm, separating said first chamber from said second chamber, and in that said lip is integral with said diaphragm.

Another subject matter still of this invention is a servomotor, characterised in that the lip is connected to a radially-inner crimping base of the diaphragm.

In accordance with another feature of the invention, a servomotor is characterised in that, at rest, the lip bears on a wall of one of said chambers.

Other features and advantages of the present invention will be apparent from the following detailed description when taken in conjunction with the accompanying drawings.

DETAILED DESCRIPTION OF THE INVENTION

Figure 1:
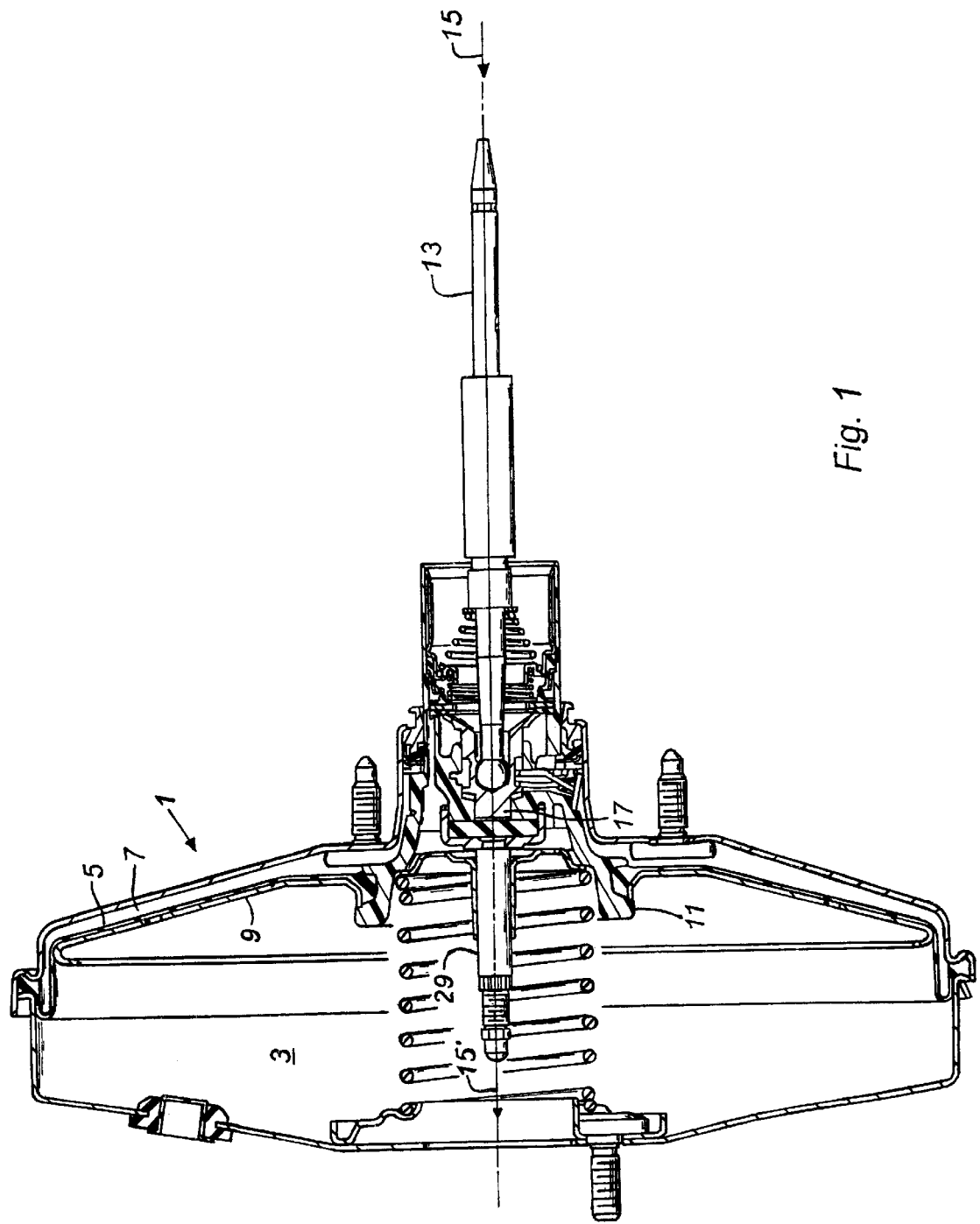
FIG. 1 is a longitudinal sectional view of an assistance servomotor of a well-known type

In FIGS. 1 through 7, the same reference numerals will designate the same elements.

FIG. 1 shows a pneumatic servomotor 1 for an assisted braking of a well-known type, in that it comprises a front chamber 3, separated from a rear chamber 7 by a tight diaphragm 5. The diaphragm 5 rests on a rigid skirt 9, driving a pneumatic piston 11 at the time of the volume variation of said chambers. A control rod 13, capable of being driven in the direction of the arrow 15 by a brake pedal (not shown), bears on a distributor plunger 17. This distributor plunger 17, as is more visible in FIGS. 2–4, controls a valve fitted with a first flap 19 shutting off, on actuation, a passage 21 connecting the front chamber 3 with the rear chamber 7 of the servomotor 1, and a second flap 23 opening, on actuation, the air-supply passage of the rear chamber 7 of said servomotor. The valve further comprises a return spring 25 for the flap and a spring 27, closing the valve when the brake is not actuated. The pneumatic piston 11 drives, in the direction of the arrow 15, a push rod 29 bearing on a primary piston of a tandem master cylinder (not shown).

The mode of operation of the servomotor of the known type will now be described with reference to FIGS. 2 through 4.

Figure 2:
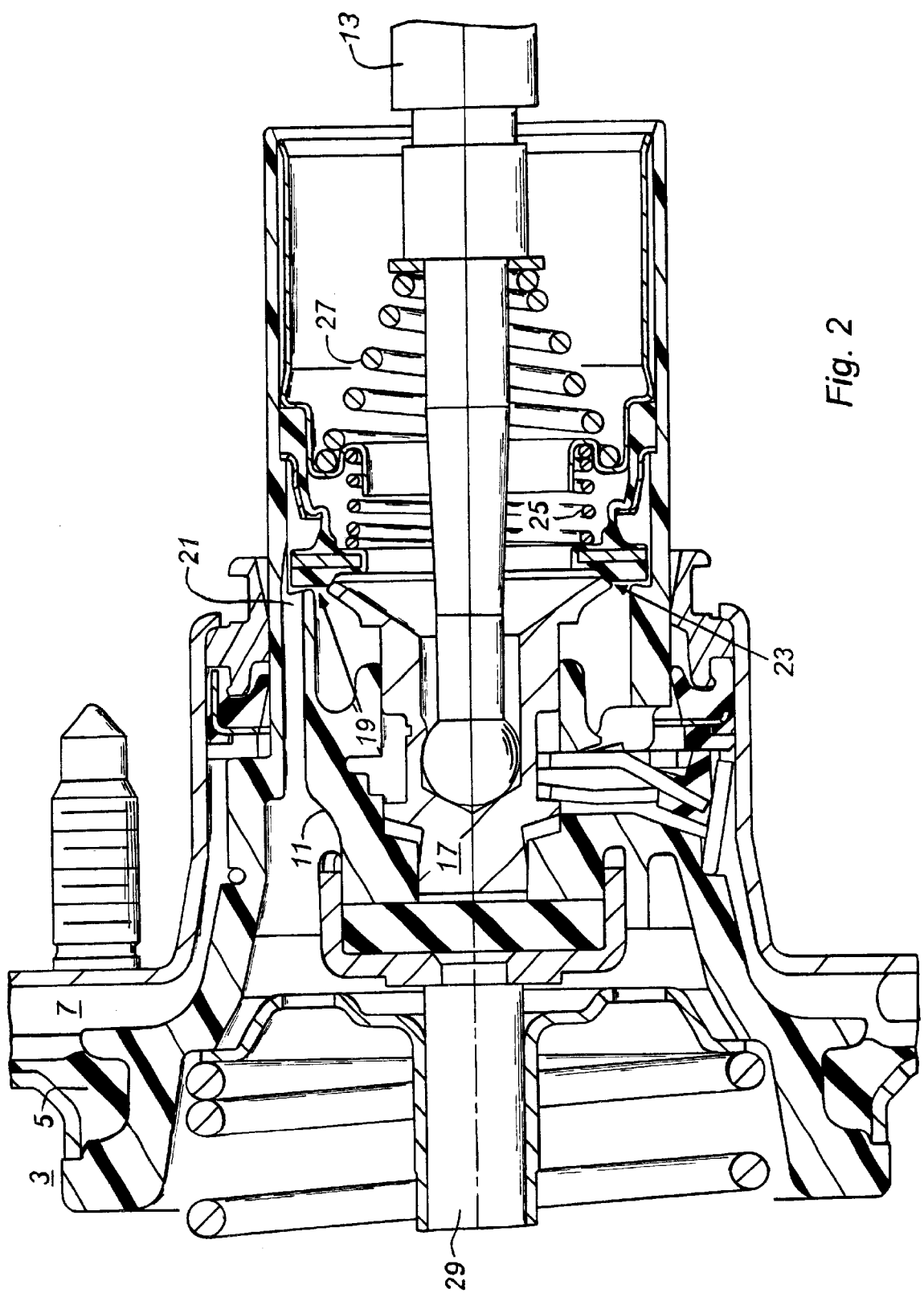
FIG. 2 is a longitudinal sectional view of a detail from FIG. 1, at rest

FIG. 2 shows the system at rest, i.e. when the driver does not depress the brake pedal. The seats of the flaps 19 and 23 are axially offset in such a way that the forward travel of the control rod 13 in the direction of the arrow 15, in the first place, closes the flap 19 and then opens the flap 23. For a given position of the control rod 13, the flap 23 opens and closes periodically in order to set the push rod 29 in the desired position and, as a result, the desired pressure in the hydraulic circuit of the braking system.

At rest, the flap 19 is permanently open whereas the flap 23 is permanently closed. Thus, the. same low pressure exists in the front chamber 3 and in the rear chamber 7.

Figure 3:
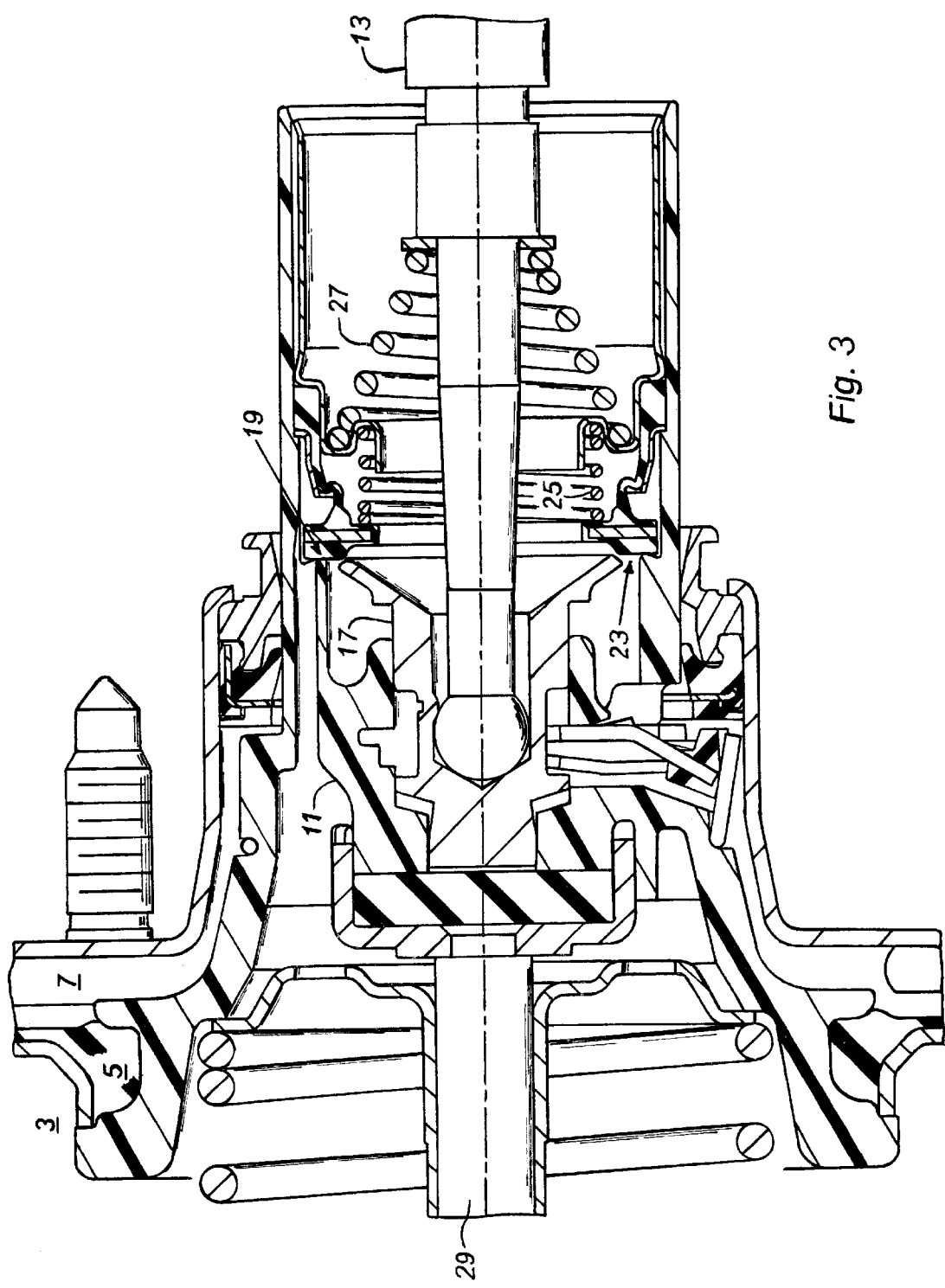
FIG. 3 is a view of the servomotor, similar to FIG. 1, but in a state in which the front and rear chambers are mutually isolated, while the rear chamber is supplied with air
Figure 4:
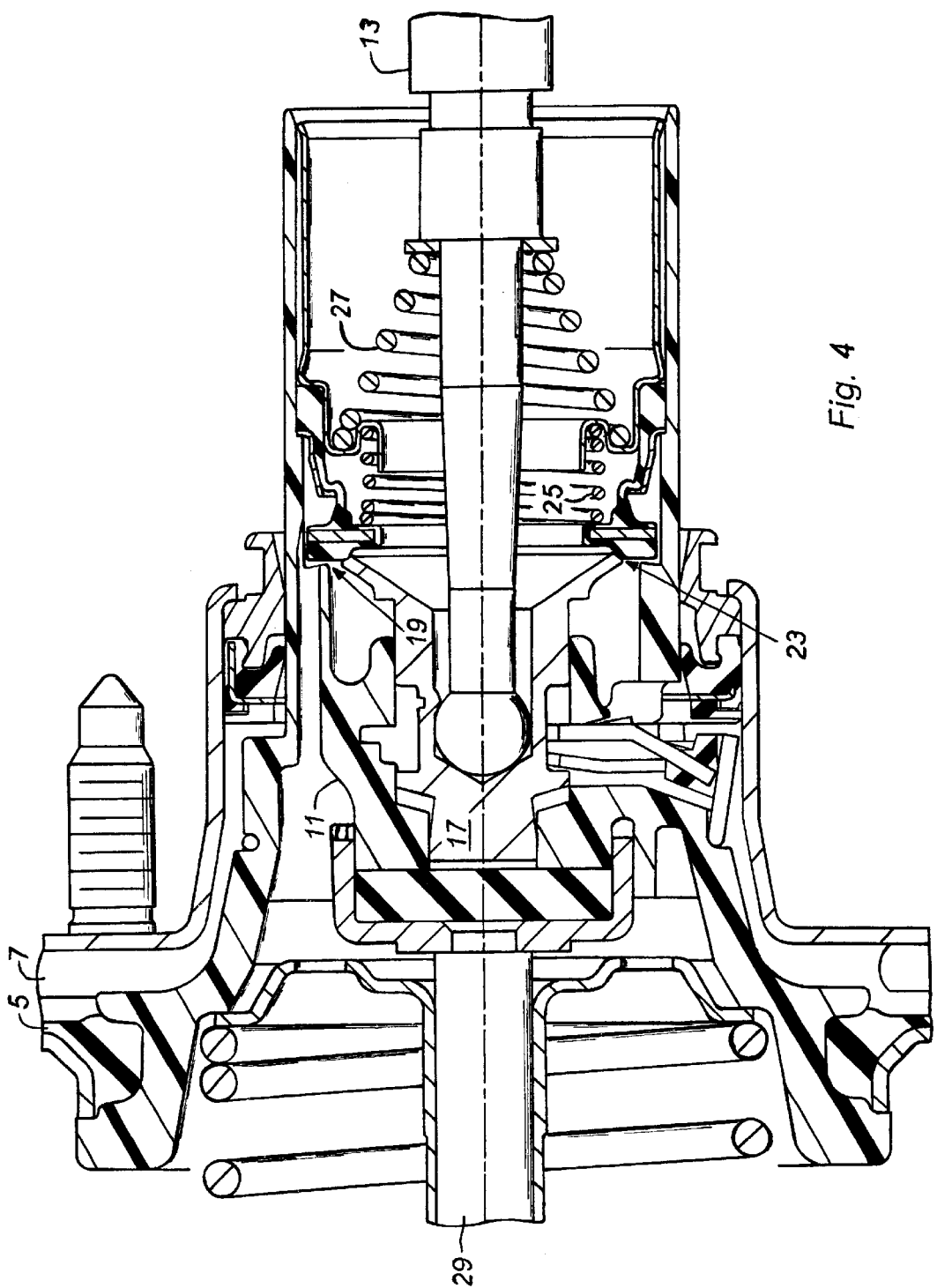
FIG. 4 is a similar view, in the event of an undesired opening of the connecting passage between the front chamber and the rear chamber

When the driver depresses the brake pedal, the control rod 13 moves forward, as shown in FIG. 3, and it drives the distributor plunger 17, thus closing the flap 19 and opening the flap 23. The atmospheric-pressure air rushes into the rear chamber 7. The pressure difference drives the skirt 9 which, in turn, moves the pneumatic piston 11 forward. In the first instance, the pneumatic piston does not meet with a noticeable resistance to its forward travel, till all the mechanical clearances at the tandem master cylinder of the hydraulic braking system are compensated. Thus, as represented in FIG. 4, such piston moves forward faster that said distributor plunger 17, borne by the control rod 13, which undesiredly causes the flap 19 to open. When the pressures are equalized between the front chamber 3 and the rear chamber 7, the piston is slowed down, thus allowing the distributor plunger 17 to close the flap 19 (state represented in FIG. 3), with the result that the pneumatic piston 11 moves forward, which means the reappearance of the state illustrated in FIG. 4, in which the flap 19 is open. The cyclic changeover from one state to the other one, as respectively shown in FIGS. 3 and 4, gives rise to the so-called "wiper noise", which is quite undesired and, moreover, it leads to an undesired supply of the front chamber 3 with air, thus reducing the efficiency of the pneumatic assistance servomotor.

The pneumatic servomotor 31 for an assisted braking according to this invention differs from the servomotor 1 of the well-known type, shown in FIGS. 1 through 4, in that it comprises means for delaying, at the beginning of the braking operation (typically before the mechanical clearance take-up at the tandem master cylinder) the forward travel of the pneumatic piston 11 in the direction of the arrow 15', so as to prevent it from moving faster that the distributor plunger 17 and consequently in order to preclude any undesired opening, in the course of the braking operation, of the flap 19 arranged between the front chamber 3 and the rear chamber 7 of the servomotor 31 according to the present invention.

Figure 5:
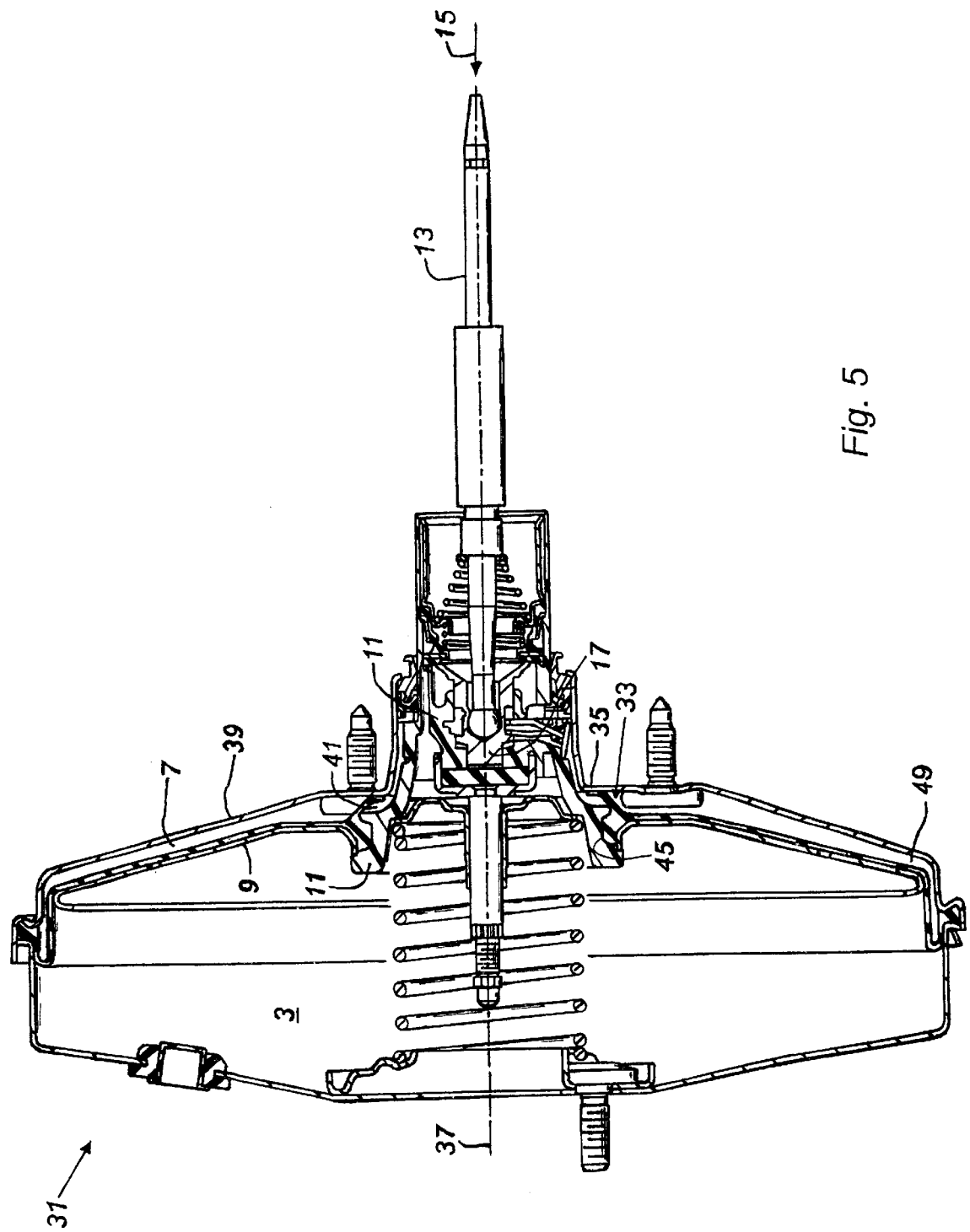
FIG. 5 is a longitudinal sectional view of the preferred embodiment of an assistance servomotor according to the present invention, at rest
Figure 6:
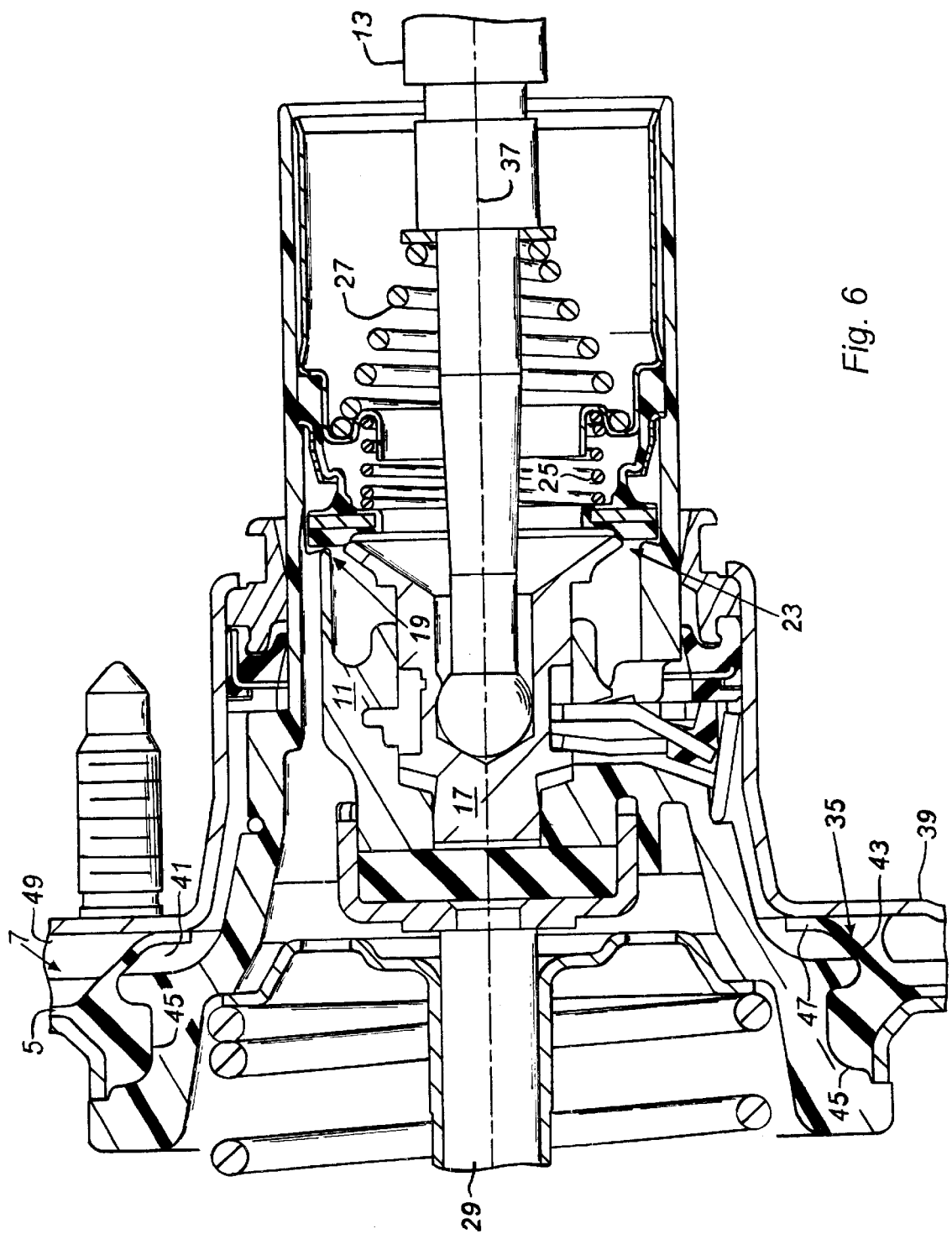
FIG. 6 is an enlarged view of a detail of the servomotor according to FIG. 5.
Figure 7:
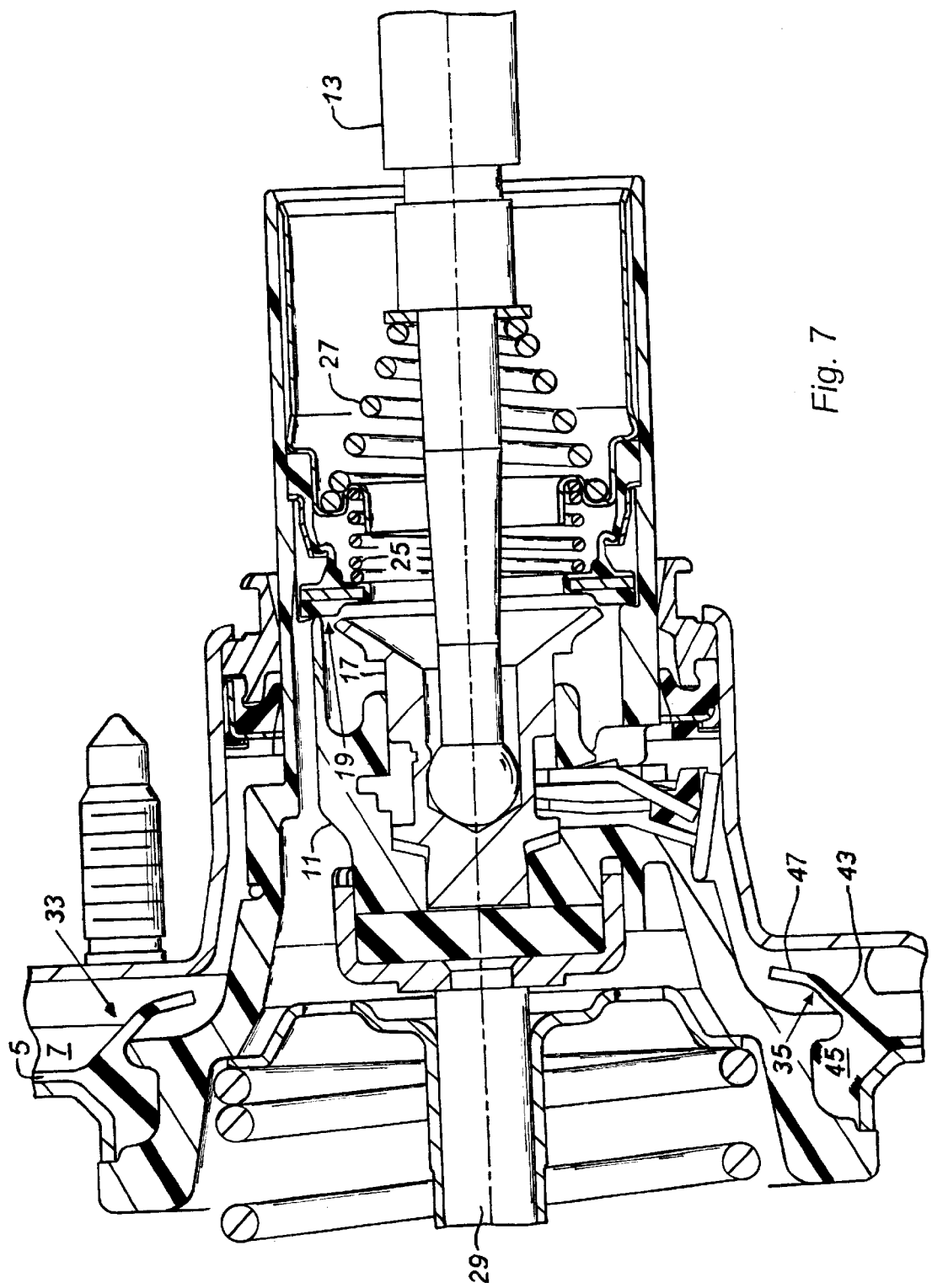
FIG. 7 is a view of a detail from FIG. 5, when the whole useful surface area of the servomotor rear chamber is supplied with air.

The illustrated advantageous embodiment comprises means 33 for temporarily confining the fluid provided for supplying the rear chamber and for moving the pneumatic piston 11 forward. In the preferred embodiment, shown in FIGS. 5 through 7, the fluid-feed passage (such fluid being typically atmospheric-pressure air) is controlled by the second flap 23 and it opens into the central part of the rear chamber 7. Thus, in this nonlimitative example, the confining means 33 advantageously comprise a seal lip, judiciously concentric with the axis 37 of the servomotor 31 in accordance with the invention. Such lip 35 defines, together with the central part of a rear wall 39 of the rear chamber 7, an initial thrust chamber 41 for the pneumatic piston 11. In the preferred example, as shown in FIGS. 5 through 7, the lip 35 forms a continuation of the diaphragm 5. In an advantageous manner, is consists of the same material as the diaphragm 5.

The flexible diaphragm 5 and the lip 35 are advantageously made of a plastomeric material, of an elastomeric material or of a mixture of both materials. In the preferred embodiment, SBR or EPDM rubber will be used, preferably having a hardness in the range from 60 SHORE A to 65 SHORE A.

In the preferred embodiment, the lip 35 includes a first radially-inner area 43, attached to a circular or substantially circular base 45 of the diaphragm 5, and a second radially-inner area 47. In the preferred embodiment, the first area 43 is inclined rearwards and towards the axis 37 at an angle substantially equal to 60° with respect to the axis 37 of the servomotor according to the present invention, whereas the area 47 lies substantially in a plane perpendicular to said axis 37.

Such configuration as particularly advantageous insofar as it allows the air to be discharged from the outer area 49 of the rear chamber 7 when the flap 19 is opened, at the very time when the lip 35 is applied to the rear wall 39. Therefore, the lip 35 functions as a one-way flap in that, when it bears on the rear wall 39, it prevents the air from flowing out of the initial thrust chamber 41 towards the outer area 49 while permitting, in the same position, the air discharge from said outer area 49 in the direction of the chamber 41.

The mode of operation of the servomotor according to this invention will now be explained.

When a driver wants either to decelerate or to stop his vehicle, he depresses the brake pedal (not shown), which transmits a force, as indicated by the arrow 15, to the control rod 13, thus moving the distributor plunger 17. The forward travel of the distributor plunger 17 first of all causes the flap 19 to close and, as a result, the front chamber 3 is hermetically isolated from the rear chamber 7. Then the flap 23 is opened, thus supplying the rear chamber 7 with a pressurized fluid, typically atmospheric-pressure air. Yet, the passage provided for the air supply of the rear chamber opens into the initial thrust chamber 41 which, at the commencement of the braking process, is more or less hermetically separated from an outer area 49 of the rear chamber 7, as shown in FIGS. 5 and 6. As a consequence, at the time of the initial thrust, once the air-feed passage for the rear chamber has been opened, there is, in the radially outer area 49 a lower pressure than the prevailing pressure in the initial thrust chamber 41. In an advantageous manner, the pressure in the outer area 49 is equal or substantially equal to the low pressure in the front chamber 3.

The force, which is applied to the pneumatic piston 11, equals the force exerted in the initial thrust chamber 41 plus the force exerted by the outer area 49, less the resisting force produced by the front chamber 3. A force is equal to the product of the pressure by the surface area. In the preferred embodiment, the pressure in the front chamber 3 and in the outer area 49 is negligible, and the initial thrust substantially equals the product of the surface area of a projection, onto a plane perpendicular to the axis 37, of the area separating the initial thrust chamber 41 from the front chamber 3. Therefore the value of said surface area is adjusted so as to obtain the desired initial thrust. The ratio of the surface area of the projection, onto a plane perpendicular to the axis 37, of the area separating the front chamber 3 from the initial thrust chamber 41 to the surface area of the projection, onto a plane perpendicular to the axis 37, of the boundary surface between the front chamber 3 and the rear chamber 7 ranges e.g. from 0.05 to 0.85, advantageously from 0.1 to 0.9 and, preferably from 0.2 to 0.7 and still more preferably it ranges from 0.25 to 0.5, for instance it can be equal to 0.25, 0.3 or 0.35.

Owing to the reduced force, which is initially exerted on the pneumatic piston 11, its initial forward speed may be reduced, prior to the taking-up of clearances at the tandem master cylinder, which enables the control rod 13 and consequently the distributor plunger 17 to follow the forward travel of the piston 11 while preventing the flap 19 from reopening and, if it does, such reopening shall be minimized. Once the initial clearance of the tandem master cylinder is taken up, the push rod 29 will slow down the forward travel of the pneumatic piston 11, at the very time when, as represented in FIG. 7, the travel of said piston causes the area 47 of the lip 35 to disengage from the rear wall 39 of the rear chamber 7, thus letting the assistance fluid, typically atomospheric-pressure air, flow into the whole rear chamber 7 and, more particularly, into the radially-outer area 49. It results in that the desired assistance is fully available, without having given rise to the so-called wiper noise, while minimizing or preferably prohibiting a flow of air from the rear chamber 7 into the front chamber 3, at the commencement of the braking operation.

The servomotor according to the present invention can be installed in any braking system whatsoever and, in particular, in braking systems using a single master cylinder or, preferably, a tandem master cylinder. And it is more specially advantageous in the case of a master system for a superassisted emergency braking, as disclosed in patent applications EP 0 662 894 and FR 2 751 602, which are included are by way of reference.

The present invention concerns, more particularly, the motor car industry.

And the present invention mainly applies to the design and manufacturing of motor vehicle braking systems.

What is claimed is:

1. A pneumatic servomotor for an assisted braking having a housing with a first variable-volume chamber and a second variable volume chamber therein, said first chamber being connected to said second chamber, said first chamber having a first fluid pressure therein, a control rod driven by travel of an input force on a brake pedal to effect a brake application, tight sealing means responding to travel of said control rod for allowing a first flap to move and isolate said first chamber from said second chamber and a second flap to move and allow a pressurised assist fluid with a second pressure to be communicated to said second chamber to creating a pressure differential between said first chamber and said second chamber, a pneumatic piston being driven by said pressure differential to effect a brake application on movement of said control rod, and means for slowing down an initial travel of said pneumatic piston at the beginning of said brake application without interfering with the efficiency of subsequent assisted braking during a brake application, characterised in that said means for slowing down said initial travel of said pneumatic piston comprises a lip that defines at the beginning of a brake application a radially-inner initial thrust chamber that receives said pressurised assist fluid and after a predetermined travel of said pneumatic piston allows communication of said pressurised assist fluid with said second chamber in the creation of said pressure differential, said with lip providing a one-way isolation permitting the discharge of said assistance fluid from second chamber on termination of said input force being applied to said brake pedal.

2. The servomotor as recited in claim 1 wherein said lip is characterised by a first area that is inclosed with respect to an axis of said servomotor and a second area that is perpendicular to said axis, said second area engaging said housing to define said thrust chamber.

3. The servomotor as recited in claim 1 wherein said first chamber is separated from said second chamber by a diaphragm and said lip is an integral component of said diaphragm.

4. The servomotor as recited in claim 3 wherein said lip is connected to a base of said diaphrgram attached to a hub.

5. The servomotor as recited in claim 4 wherein said lip engages said housing on termination of said input force to said brake pedal.

6. The servomotor as recited in claim 1 wherein said lip engages said housing and is flexible in allowing said assist fluid to be removed from said second chamber on termination of said input force to said brake pedal.

* * * * *